(12) United States Patent
McCrery et al.

(10) Patent No.: US 11,727,347 B2
(45) Date of Patent: Aug. 15, 2023

(54) AUTOMATED SYSTEM FOR MANAGEMENT OF RECEPTACLES

(71) Applicant: United States Postal Service, Washington, DC (US)

(72) Inventors: Marc D. McCrery, Washington, DC (US); Donald Eugene Irwin, Fredericksburg, VA (US)

(73) Assignee: United States Postal Service, Washington, DC (US)

( * ) Notice: Subject to any disclaimer, the term of this patent is extended or adjusted under 35 U.S.C. 154(b) by 495 days.

(21) Appl. No.: 16/202,896

(22) Filed: Nov. 28, 2018

(65) Prior Publication Data

US 2019/0164123 A1 May 30, 2019

Related U.S. Application Data

(60) Provisional application No. 62/671,886, filed on May 15, 2018, provisional application No. 62/591,654, filed on Nov. 28, 2017.

(51) Int. Cl.
*G06Q 10/08* (2023.01)
*G06Q 10/0836* (2023.01)
*G06Q 10/0833* (2023.01)
*G06Q 10/083* (2023.01)

(52) U.S. Cl.
CPC ..... *G06Q 10/0836* (2013.01); *G06Q 10/0833* (2013.01); *G06Q 10/0838* (2013.01)

(58) Field of Classification Search
CPC .. G06Q 10/08; G06Q 10/083; G06Q 10/0833; G06Q 10/0836; G06Q 10/0838; G06Q 10/0631; A47G 29/12–141
See application file for complete search history.

(56) References Cited

U.S. PATENT DOCUMENTS

| 7,390,986 | B2 | 6/2008 | McDonald |
| 7,671,293 | B2 | 3/2010 | Fry et al. |
| 7,820,932 | B2 | 10/2010 | Stemmle |
| 7,858,894 | B2 | 12/2010 | Stemmle |
| 8,271,127 | B2 | 9/2012 | Cartal et al. |
| 8,504,192 | B2 | 8/2013 | Faivre et al. |
| 9,037,287 | B1 | 5/2015 | Grauberger et al. |
| 9,205,461 | B2 | 12/2015 | Norris et al. |

(Continued)

OTHER PUBLICATIONS

Song, Junyao, and Gisela Gamborg Nielsen. "The potential of using digital lockers as a delivery and return method for online purchasing of clothes." (2017). (Year: 2017).*

*Primary Examiner* — Scott M Tungate

(74) *Attorney, Agent, or Firm* — Knobbe Martens Olson & Bear LLP

(57) ABSTRACT

A management system for managing the utilization of item receptacles in a distribution network. Items can be transferred to recipients at a limited number of item receptacles in unit delivery facilities of the distribution network. Item retrieval behavior is tracked to determine a recipient score for known recipients. Based on the recipient scores, subsequent items to be transferred can be placed in a receptacle or a storage area based on the associated recipient score. Placement in receptacles can be prioritized to recipients with low scores indicating that the item will likely be retrieved quickly, while items addressed to recipients with high scores may not be placed into a receptacle if receptacles are scarce.

20 Claims, 8 Drawing Sheets

(56) References Cited

U.S. PATENT DOCUMENTS

| | | | |
|---|---|---|---|
| 9,669,430 B2 | 6/2017 | Tresse et al. | |
| 10,675,660 B1 | 6/2020 | Fagan | |
| 10,970,667 B2 | 4/2021 | Dearing et al. | |
| 2002/0139726 A1 | 10/2002 | Roth et al. | |
| 2004/0030661 A1 | 2/2004 | Amato | |
| 2014/0279663 A1* | 9/2014 | Lievens | G06Q 30/02 705/338 |
| 2015/0371187 A1* | 12/2015 | Irwin | G07F 9/002 705/72 |
| 2016/0239795 A1* | 8/2016 | Burch, V | G06Q 10/087 |
| 2018/0121872 A1* | 5/2018 | Walsh | G06Q 10/0833 |
| 2018/0240181 A1* | 8/2018 | Lopez | G06Q 10/08355 |
| 2021/0023587 A1 | 1/2021 | Bombaugh | |

* cited by examiner

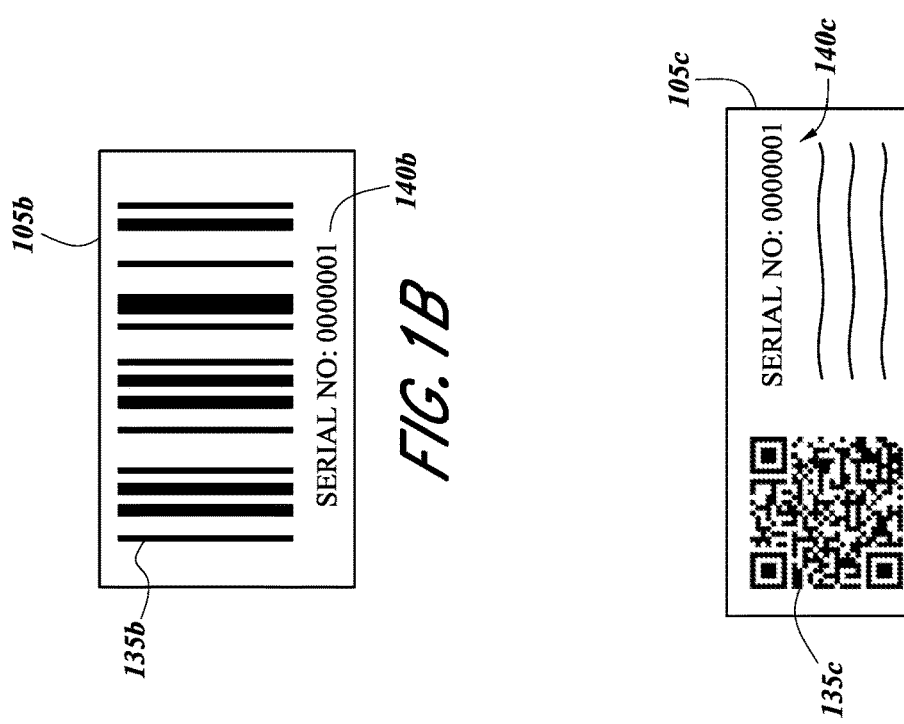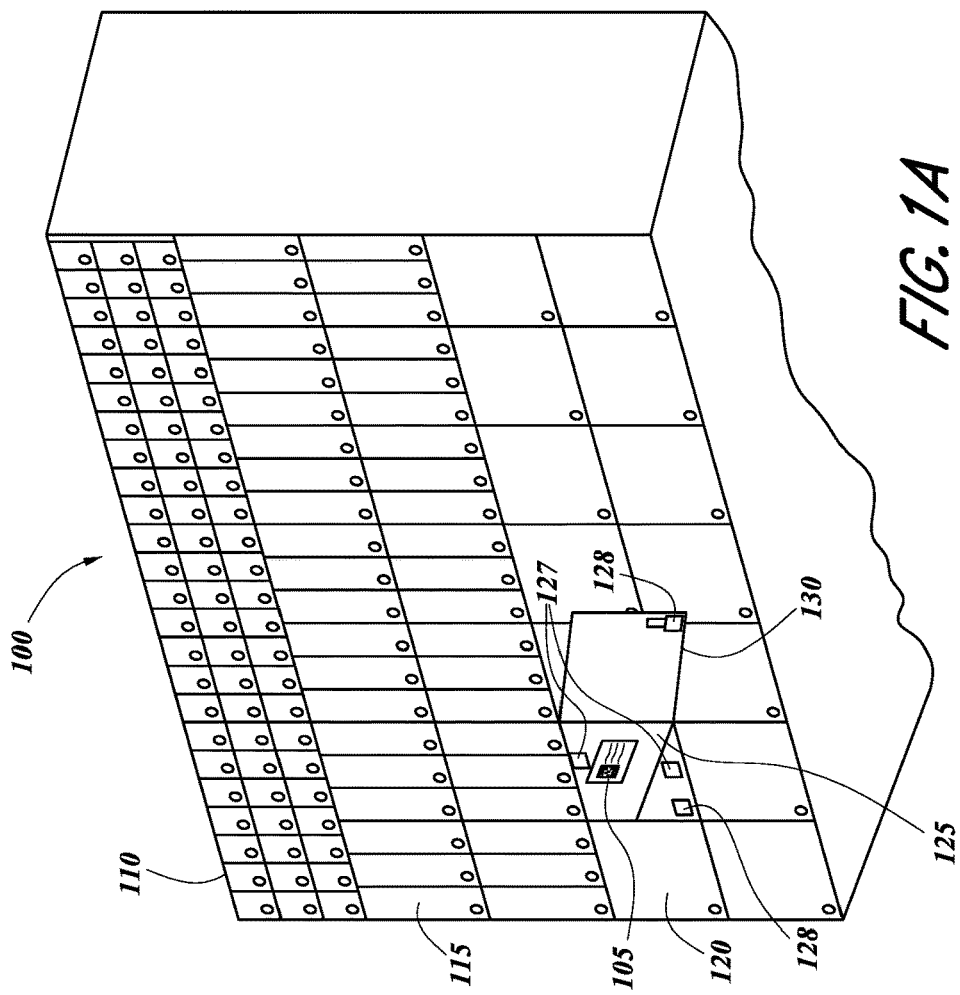

AUTOMATED SYSTEM FOR MANAGEMENT OF RECEPTACLES

CROSS-REFERENCE TO RELATED APPLICATIONS

This application claims the benefit of U.S. Provisional Application Ser. No. 62/591,654, filed Nov. 28, 2017, entitled "AUTOMATED SYSTEM FOR MANAGEMENT OF RECEPTACLES," and U.S. Provisional Application Ser. No. 62/671,886, filed May 15, 2018, entitled "AUTOMATED SYSTEM FOR MANAGEMENT OF RECEPTACLES," both of which are hereby incorporated by reference in their entirety and for all purposes.

FIELD

This disclosure relates to systems and methods for the management of item receptacles.

DESCRIPTION OF THE RELATED TECHNOLOGY

Items, such as parcels, packages, envelopes, etc., may be shipped in a distribution network and transferred to recipients at receptacles. A unit delivery facility often receives a number of items to be transferred greater than the number of receptacles at the unit delivery facility. When additional receptacles are not available, items often must be kept in a storage room with other items, requiring recipients to wait in line for an employee of the distribution network to find an item in the storage room.

SUMMARY

In one embodiment, a system for delivery of items is described. The system comprises a plurality of receptacles; a memory storing a plurality of recipient scores, each recipient score associated with one of a plurality of customers, and receptacle information; and a destination device in communication with the memory. The destination device comprises a scanning device and a processor configured to obtain, using the scanning device, an image of an item to be transferred to a recipient among the plurality of customers; determine alphanumeric item identification information based on the image; retrieve, from the database, the recipient score corresponding to the recipient; and allocate the item, based at least in part on the recipient score and a predetermined score threshold, to one of the receptacles.

In some embodiments, each recipient score is calculated based on one or more of an initial recipient score value, historical data corresponding to retrieval of items by the recipient associated with the recipient score, and a status of the recipient associated with the recipient score. In some embodiments, at least some of the recipient scores are calculated based in part on the status of the recipient associated with the recipient score, the status corresponding to a prioritized status requested by the recipient associated with the recipient score. In some embodiments, at least some of the recipient scores are calculated based in part on historical data corresponding to delay in retrieval of items by the recipient associated with the recipient score. In some embodiments, the processor of the destination device is further configured to obtain, using the scanning device, an image of an asset tag corresponding to the receptacle to which the item is allocated, and to transmit a message indicative of the item being placed into the receptacle to which the item is allocated. In some embodiments, the message causes, at least in part, an electronic notification to be sent to a device or account corresponding to the recipient, the electronic notification comprising at least one of a receptacle identifier and machine readable information operable to unlock an electronic lock. In some embodiments, the processor of the destination device is further configured to cause a display of the destination device to display a human readable notification comprising a receptacle identifier corresponding to the receptacle to which the item is allocated. In some embodiments, the plurality of receptacles comprise lockable item receptacles located in a publicly accessible area of a unit delivery facility. In some embodiments, the processor of the destination device is further configured to periodically obtain images of asset tags corresponding to unoccupied receptacles of the plurality of receptacles and to cause, at least in part, an update to one or more of the receptacle information, the recipient scores and the score threshold based at least in part on the images of asset tags. In some embodiments, the processor of the destination device is further configured to obtain, using the scanning device, an image of a second item to be transferred to a second recipient among the plurality of customers; determine second alphanumeric item identification information based on the image; retrieve, from the database, a second recipient score corresponding to the second recipient; determine, based at least in part on the second recipient score and the predetermined score threshold, that the second item will not be allocated to any of the receptacles; and cause a display of the destination device to display a human readable notification indicative of the second item not being allocated to a receptacle. In some embodiments, the human readable notification comprises an identifier of a storage location in which the item should be placed, the storage location configured to receive a plurality of items.

In another embodiment, a method for distributing items to recipients is described. the method comprises receiving receptacle availability information including a number of available receptacles at a unit delivery facility containing a set of receptacles, receiving item quantity information including a number of items to be distributed to recipients at the unit delivery facility, receiving a plurality of recipient scores corresponding to recipients associated with the items to be distributed, and determining, based on the receptacle availability information and the recipient scores, a score threshold. The method further comprises, for at least some of the items, scanning the item to obtain an image of the item, determining alphanumeric item identification information associated with the item based on the image, determining the recipient score corresponding to the recipient associated with the item, and placing the item into a receptacle of the set of receptacles based on the recipient score being below the score threshold.

In some embodiments, the method further comprises, for at least some of the items, scanning the item to obtain an image of the item, determining alphanumeric item identification information associated with the item based on the image, determining the recipient score corresponding to the recipient associated with the item, and determining that the item will not be placed into a receptacle of the set of receptacles based on the recipient score not being below the score threshold. In some embodiments, the method further comprises receiving subsequent receptacle availability information indicating that the item has been retrieved from the receptacle, and causing, at least in part, an update to the recipient score corresponding to the recipient associated with the item based on an elapsed time between placing the item into the receptacle and receiving the subsequent receptacle availability information. In some embodiments, the update to the recipient score increases a probability that subsequent items associated with the recipient will be placed into a receptacle if the elapsed time is relatively short, and the update to the recipient score decreases the probability that subsequent items associated with the recipient will be placed into a receptacle if the elapsed time is relatively long. In some embodiments, the method further comprises causing, at least in part, an electronic notification to be sent to a device or account corresponding to the recipient, the electronic notification comprising at least one of a receptacle identifier and machine readable information operable to unlock an electronic lock.

In another embodiment, a system for managing a plurality of receptacles for distributing items to recipients is described. The system comprises means for maintaining receptacle availability information indicative of a number of unoccupied receptacles in a unit delivery facility; means for maintaining item information indicative of a number of items to be distributed to recipients via the unit delivery facility; means for maintaining recipient score information corresponding to a plurality of known recipients associated with the unit delivery facility; means for determining, based on the receptacle availability information and the item information, a score threshold for allocation of the items to unoccupied receptacles; and means for allocating at least some of the items to unoccupied receptacles based on the recipient score information and the score threshold.

In some embodiments, the means for maintaining receptacle availability information, the means for maintaining item information, and the means for determining a score threshold are each configured to update on a periodic schedule. In some embodiments, the means for maintaining recipient score information is configured to update on an event-based schedule. In some embodiments, the system further comprises means for sending electronic notifications to recipients associated with the items allocated to unoccupied receptacles.

BRIEF DESCRIPTION OF THE DRAWINGS

The foregoing and other features of the disclosure will become more fully apparent from the following description and appended claims, taken in conjunction with the accompanying drawings.

FIG. 1A is a perspective view of an embodiment of a wall containing item receptacles in a unit delivery facility of a distribution network.

FIG. 1B is a front elevation view of an exemplary asset tag in a receptacle management system.

FIG. 1C is a front elevation view of an exemplary asset tag in a receptacle management system.

DETAILED DESCRIPTION

Figure 2:
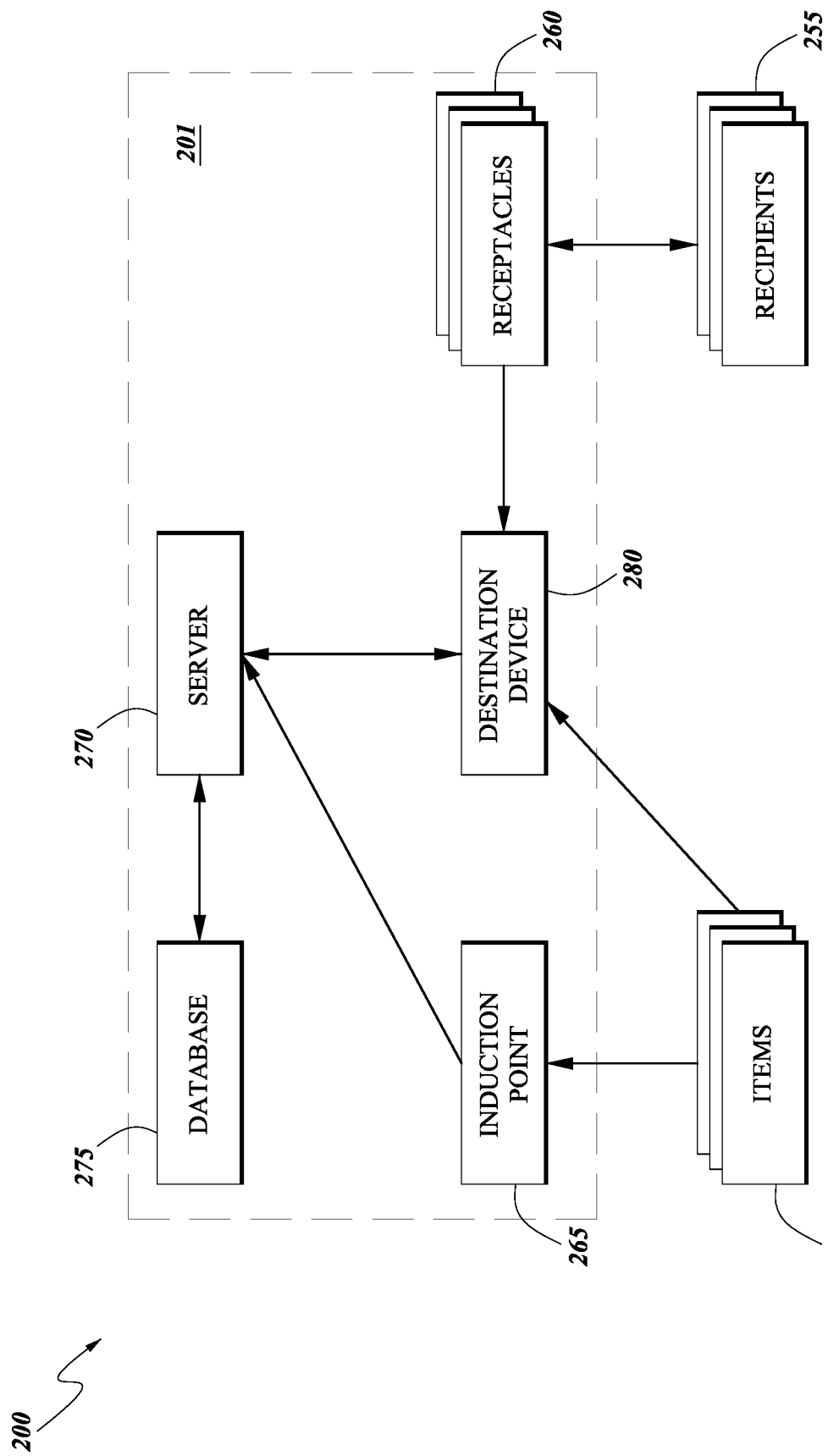
FIG. 2 is a block diagram of an embodiment of a receptacle management system implemented in a distribution network.

In the following detailed description, reference is made to the accompanying drawings. In the drawings, similar symbols typically identify similar components, unless context dictates otherwise. Thus, in some embodiments, part numbers may be used for similar components in multiple figures, or part numbers may vary from figure to figure. The illustrative embodiments described herein are not meant to be limiting. Other embodiments may be utilized, and other changes may be made, without departing from the spirit or scope of the subject matter presented. It will be readily understood that the aspects of the present disclosure and illustrated in the figures, can be arranged, substituted, combined, and designed in a wide variety of different configurations by a person of ordinary skill in the art, all of which are made part of this disclosure.

Reference in the specification to "one embodiment," "an embodiment", or "in some embodiments" means that a particular feature, structure, or characteristic described in connection with the embodiment is included in at least one embodiment of the invention. Moreover, the appearance of these or similar phrases throughout the specification does not necessarily mean that these phrases all refer to the same embodiment, nor are separate or alternative embodiments necessarily mutually exclusive. Various features are described herein which may be exhibited by some embodiments and not by others. Similarly, various requirements are described which may be requirements for some embodiments but may not be requirements for other embodiments.

A distribution network generally transfers items from senders to recipients. The distribution network transfers an item from an entry point where an item is received, to a destination point. In some embodiments, the destination point can be a unit delivery facility having receptacles associated with the recipient of the item. Each recipient may be associated with a receptacle (e.g., a post office box) at the unit delivery facility of the distribution network and/or a delivery address (e.g., a home or business location of the recipient). Each delivery address may further be associated with a nearby unit delivery facility. Thus, items arriving at the unit delivery facility from elsewhere in the distribution network can be placed into an appropriate receptacle at the unit delivery facility for retrieval by the recipient, or can be placed into a vehicle at the unit delivery facility for delivery to the delivery address of the recipient.

Distribution networks frequently deliver items that are larger than the delivery boxes assigned to recipients at unit delivery facility and/or larger than mailboxes or other delivery boxes at recipients' delivery addresses. For larger items being delivered to delivery addresses, rules associated with such items may require a recipient to be present at the delivery address when the item is delivered. When the recipient is not present, the items may need to be returned to the associated unit delivery facility, where the recipient can retrieve the item. In some cases, a recipient associated with a delivery address may choose not to have home delivery for large items. Thus, larger items may be held in one or more storage locations at unit delivery facilities until the corresponding recipients arrive to receive their items. The storage locations corresponding to stored items may be associated with a delivery notification item left at the delivery address corresponding to the item to enable more efficient retrieval of the items from storage locations at unit delivery facilities. Unit delivery facilities may further include one or more common item receptacles that are not assigned to individual recipients. A relatively large item can be placed into an item receptacle, and a key corresponding the receptacle can be placed into an assigned receptacle associated with the recipient of the item. The recipient can then use the key at the unit delivery facility to open the item receptacle and retrieve the large item.

Non-assigned common item receptacles can conveniently allow recipients to retrieve their items without having to wait in line for an employee to search for and retrieve the items from a storage location. However, a unit delivery facility may frequently receive more items for distribution than the number of common item receptacles located in the unit delivery facility. Accordingly, some items still must be kept in a storage location for retrieval. Assigning items to receptacles randomly or on a first-come, first-served basis may be relatively inefficient. For example, if common receptacles are filled randomly, some items sent to recipients who typically wait several days or weeks to retrieve items may still be placed in a receptacle, while items sent to recipients who regularly retrieve their items more frequently (e.g., daily, every two days, etc.) may be placed in a storage area where they must be searched for and retrieved by an employee. Thus, the receptacle management systems disclosed herein are configured to determine retrieval time scores for recipients, and use the scores to prioritize the allocation of receptacles to items that will likely be retrieved soonest, decreasing item retrieval time for timely recipients and increasing or optimizing the number of items that can be transferred to recipients using a set number of item receptacles. In some embodiments, the storage areas may further be subdivided into smaller storage locations, reducing the amount of time required to search for an item in the storage area.

FIG. 1A is a perspective view of a wall containing item receptacles 100 in a unit delivery facility of a distribution network. The receptacles 100 include small and large assigned receptacles 110, 115, and common item receptacles 120. As described above, the assigned receptacles 110, 115 can each be dedicated for use by an individual recipient. The common item receptacles 120 are non-assigned, and can receive an item associated with any recipient. For example, each common item receptacle 120 can have a corresponding key configured to unlock the receptacle 120. When an item is placed into a particular receptacle 120, the associated key can be placed into an assigned receptacle 110, 115 corresponding to the recipient of the item, or can otherwise be transferred to the recipient such that the recipient can receive and use the key to retrieve the item from the common item receptacle 120.

Each common item receptacle 120 includes a door 130 and an interior surface 125. In some embodiments, each common item receptacle 120 further includes an item detector 127 and/or a door detector 128. The item detector 127 can include one or more of an optical detector, an image capture device, a laser proximity detector, or the like. The item detector is positioned within the common item receptacle 120 so as to detect the presence or absence of an item within the common item receptacle 120. The door detector 128 can include one or more of an optical sensor or a physical proximity or connection sensor. The door detector 128 is positioned on and/or near the door 130 of the common item receptacle 120 so as to detect whether the door 130 is open or closed. In some embodiments, the door detector is primarily configured to detect door opening events when the door 130 is opened, instead of or in addition to continuously detecting whether the door is open or closed.

An asset tag 105 can be affixed to the interior surface 125. The asset tag 105 can include receptacle identification information, such as an alphanumeric code (e.g., a receptacle identifier) uniquely identifying the receptacle 120. In some embodiments, the code corresponding to each receptacle 120 can be unique among all receptacles 120 in the distribution network, such that receptacle management systems and methods can be implemented locally and/or centrally for a distribution network without errors caused by duplicated receptacle identifiers. The information contained within the asset tag 105 can be displayed in an alphanumeric printed format and/or a machine-readable or optically scannable format such as a barcode or QR code, as shown in greater detail in FIGS. 1B and 1C. The asset tag 105 in each receptacle 120 can be located such that the asset tag 105 can be scanned by an employee when placing an item into the receptacle 120. For example, the asset tag 105 can be placed on a bottom or side interior surface 125 close to the door 130 or a rear opening (not shown) such that the asset tag can quickly and easily be scanned using a portable scanner such as the destination device 380, described with reference to FIGS. 3A and 3B, before or after placing an item into the receptacle 120. In some embodiments, the asset tag 105 can be placed in a location in which it is only accessible to an employee of the distribution network for scanning, such as in a rear portion of the receptacle 120.

FIGS. 1B and 1C depict a closer view of exemplary asset tags 105b and 105c. The asset tags 105b and 105c include optically scannable information in the form of a barcode 135b or a QR code 135c. The asset tags 105b and 105c further include identifying information such as a serial number in an alphanumeric printed format 140b, 140c. In various embodiments, some or all of the information included in the barcode 135b or QR code 135c may be duplicated in the alphanumeric information 140b, 140c. It will be appreciated that some implementations may utilize asset tags including only an optically scannable information format 135b, 135c, or only an alphanumeric printed format 140b, 140c.

FIG. 2 is a block diagram of a receptacle management system 200 implemented in a distribution network 201. The distribution network 201 distributes items 250 to recipients 255. The distribution network 201 includes an induction point 265 which obtains identification information from the items 250 when they are inducted into the distribution network 201, and a destination device 280 which detects the identification information when the items 250 reach an endpoint of the distribution network 201, such as a unit delivery facility where the items 250 are placed into receptacles 260 to be retrieved by the recipients 255. A server 270 is in communication with the induction point 265, the destination device 280, and a database 275.

The induction point 265 includes one or more devices configured to obtain information from items 250, which can be a package, envelope, parcel, or the like. For example, the induction point 265 can include processing equipment having elements such as an optical scanner, a drop box, a computer configured to generate postage information and/or item labels, or other components. The destination device 280 similarly includes one or more pieces of processing equipment configured to obtain information from items 250. The destination device 280 can include a scanning device such as an optical scanner, barcode scanner, and the like. For example, the destination device 280 can be a portable user device configured for use by an employee of the distribution network to scan items 250 before the items 250 received at the unit delivery facility are placed into the receptacles 260 for transfer to the recipients 255. The destination device 280 has a communication module to send information, such as item information detected from items 250 or receptacle identification information detected from receptacles 255, to the server 270. The server 270 includes one or more computing devices including a processor and onboard memory configured to execute automated receptacle management processes. The memory can store data received from the processor and send data stored thereon to the processor. In various embodiments, the server 270 can be a single computing device, or can include multiple computing devices in the same or different locations. Multiple computing devices of the server 270 can be in communication via a wired connection and/or a wireless connection such as the internet or other communication network. Some or all of the computing devices of server 270 can be located, for example, at a facility of the distribution network 201 containing an induction point 265, at a unit delivery facility of the distribution network 201 containing a destination device 280, or elsewhere, such as in a centralized receptacle management system 200 control location.

At the induction point 265, items 250 are inducted into the distribution network 201 and transferred directly or indirectly to the destination device 280. Information received from the items 250 at the induction point 265, such as item identification information (e.g., an alphanumeric identification or tracking number such as an item identifier), postage payment information, destination information, recipient information, or other information, can be sent to the server 270. The destination device 280 detects at least one type of information from items 250 that was also detected at the induction point 265, such as item identification information, so that items 250 arriving at the destination device 280 can be matched to items 250 received at the induction point 265. The destination device 280 is further configured to receive information from the server 270, such as receptacle allocation information, individual receptacle assignments, or other instructions to a user of the destination device 280.

The server 270 is configured to receive information from the induction point 265 and send and receive information from the destination device 280. The server 270 is further configured to send information to and receive information from the database 275. For example, the server 270 can cause entries within the database 130 to be created, modified, and/or deleted. In some embodiments a central computing device of the server 270 can control functions such as overall management of the receptacle management system 200 and profiles or other information associated with the recipients 255, and a remote computing device of the server 270 located at the office containing the destination device 280 can control destination-specific functions such as allocation of receptacles 255 to items 250 based on receptacle availability and information associated with the recipients 255.

Figure 3B:
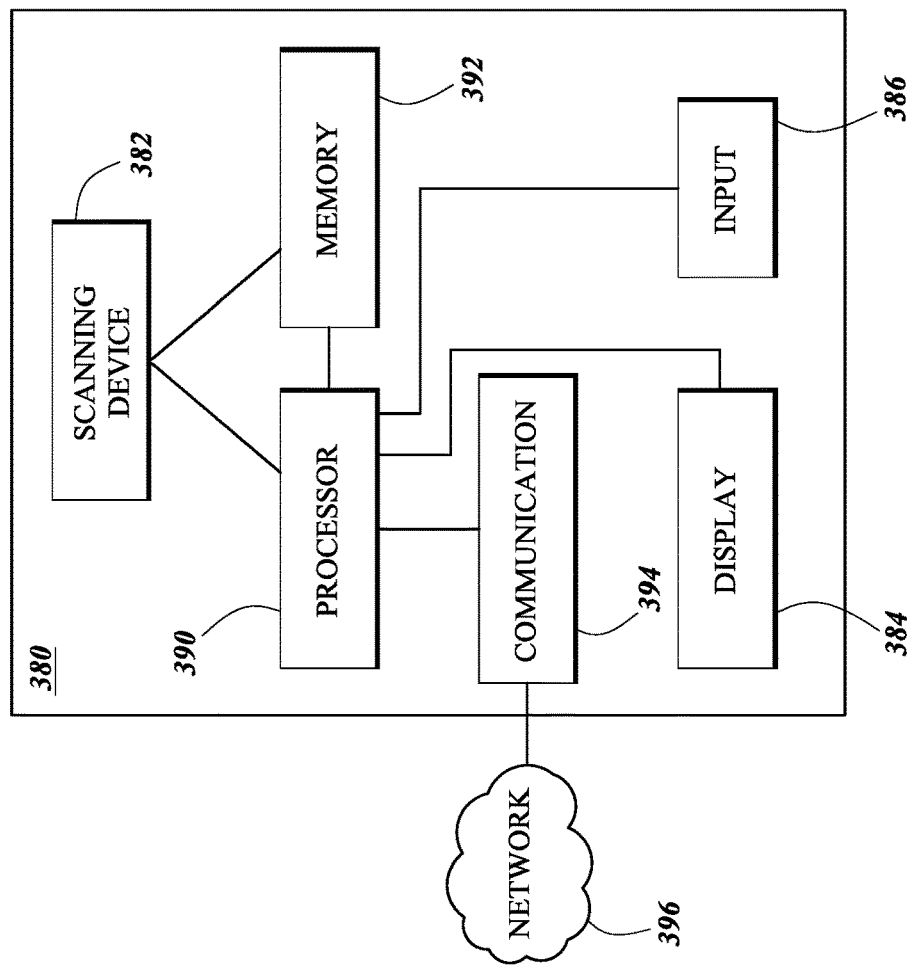
FIG. 3B is a block diagram of a destination device of an embodiment of a receptacle management system.
Figure 3A:
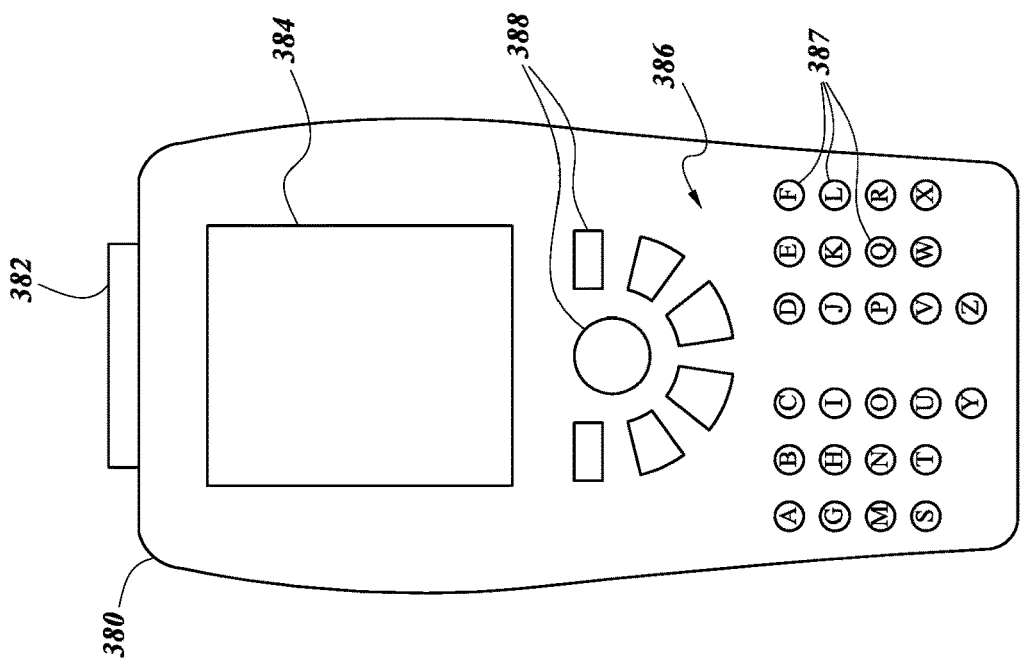
FIG. 3A is a front elevation view of a destination device of an embodiment of a receptacle management system.

FIG. 3A is a front elevation view of a destination device 380 of a receptacle management system. FIG. 3B is a block diagram of the destination device 380. The destination device 380 can be a handheld device for use by an employee of a distribution network. In various embodiments, the destination device 380 can be a dedicated device for receptacle management process, or a multi-purpose device such as a scanner used for other item tracking functions and/or other functions in the distribution network. In some embodiments, the destination device 380 can be a smartphone or other personal electronic device including one or more receptacle management system applications. The destination device 380 includes a scanning device 382, a display 384, and an input 386. Internal components of the destination device 380 include a processor 390, a memory 392, and a communication module 394 configured to communicate with one or more other components of the receptacle management system, such as a server, database, or other electronic component, over a network 396.

The scanning device 382 can include one or more of a camera, a pen-type scanner, a laser scanner, a CCD scanner, an omnidirectional barcode or QR code scanner, or the like. The scanning device 382 is in communication with the processor 390 and/or the memory 392. The processor 390 can control the scanning device 382, such as by initiating an image capture or barcode scan, and can further receive and analyze images obtained at the scanning device 382. The memory 392 can receive and store the images obtained at the scanning device 382, either directly from the scanning device 382 or from the processor 390. The processor 390 can analyze images obtained at the scanning device 382 to determine information contained within a barcode, QR code, or other format within the images. In some embodiments, the processor 390 is configured to determine the content of text within an image using optical character recognition (OCR) or other text recognition processes.

The input 386 can include various controls such as alphanumeric keys 387 and/or navigation and selection buttons 388. The navigation and selection buttons 388 can be used to navigate and/or select items displayed in a graphical user interface on the display 384. In some embodiments, the input can include touch screen functionality of the display 384, in addition to or instead of alphanumeric keys 387 and/or navigation and selection buttons 388. In one example, a user may select options from a menu such as scanning a label on an item to be delivered, scanning an asset tag of an empty receptacle, scanning an asset tag of an inoperative receptacle etc. The alphanumeric keys 387 can be used to enter information. For example, if a user has difficulty scanning an asset tag due to a damaged or marked barcode or QR code, item identification information can be entered manually into the destination device 380 using the alphanumeric keys 387. As will be described in greater detail below with reference to FIGS. 5-8, the destination device 380 can be used by an employee of a distribution network when performing tasks such as distributing arriving items to receptacles for transfer to recipients, scanning asset tags within receptacles or storage locations for inventory purposes, or the like.

Figure 4:
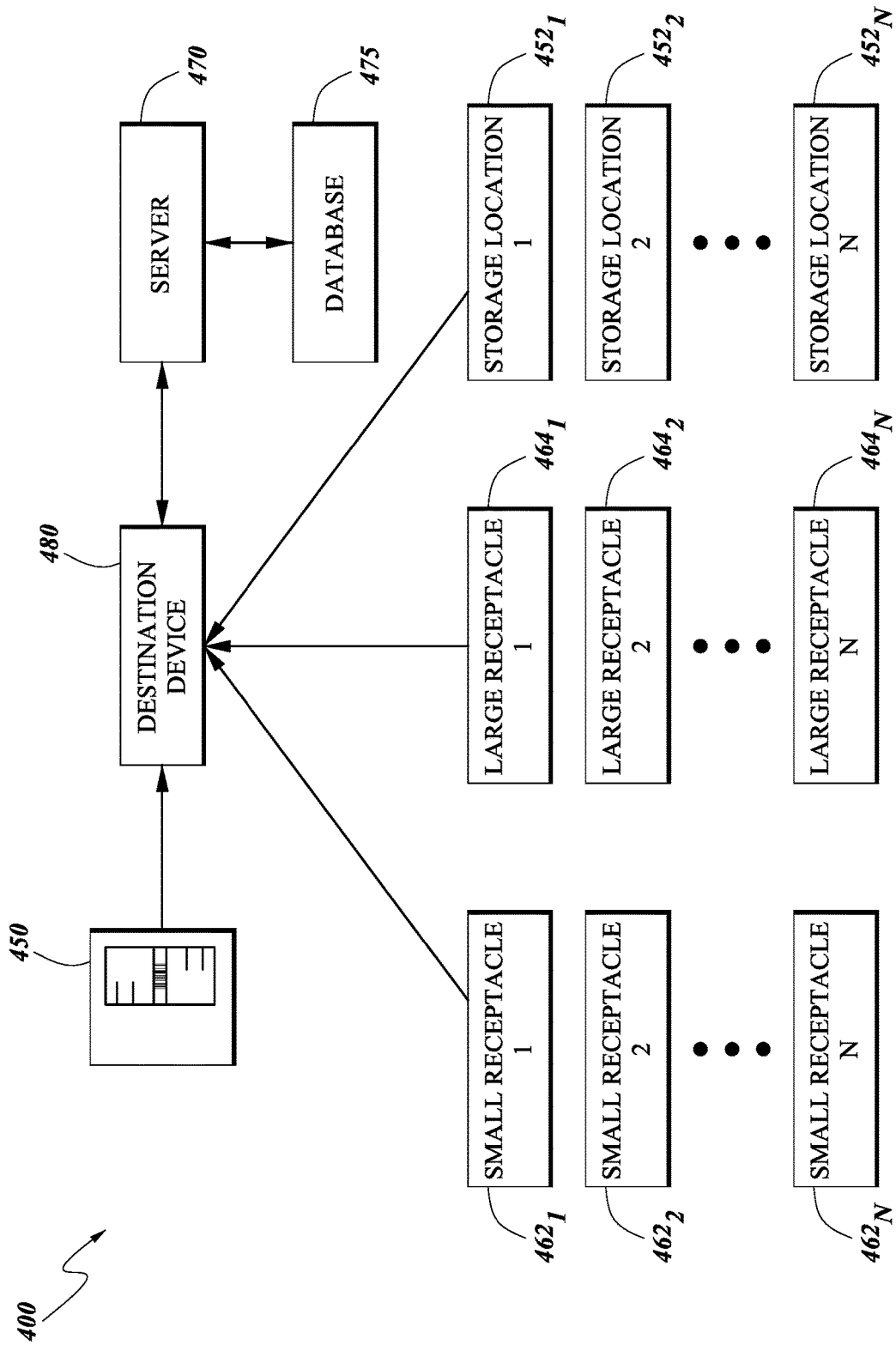
FIG. 4 is a block diagram of an embodiment of receptacle management system components at a unit delivery facility of a distribution network.

FIG. 4 is a block diagram of a receptacle management system 400 implemented in a unit delivery facility of a distribution network. The receptacle management system 400 includes a destination device 480 in communication with a server 470, and a database 475 in communication with the server 470. The destination device 480 is located within the unit delivery facility of the distribution network. The destination device 480 can be a portable computing device such as the destination device 380 of FIGS. 3A and 3B, including a scanning device for optically scanning information by reading barcodes, QR codes, alphanumeric text, or the like. The server 470 and the database 475 can also be located within the office of the distribution network, or can be located elsewhere, as described above with reference to FIG. 2. The receptacle management system 200 is configured to manage a plurality of receptacles such as small receptacles $462_1$, $462_2$, ... $462_N$ and large receptacles $464_1$, $464_2$, ... $464_N$. In some embodiments, the receptacle management system is further configured to manage a plurality of storage locations $452_1$, $452_2$, ... $452_N$. In various embodiments, the number of receptacles and/or storage locations managed in a single office of a distribution network can range from a relatively small set of 2-5 receptacles up to tens or hundreds of receptacles and/or storage locations, or more. When an item 450 arrives at the unit delivery facility, it can be scanned at the destination device 205 and can be distributed to one of the small receptacles $462_1$, $462_2$, ... $462_N$, large receptacles $464_1$, $464_2$, ... $464_N$, or storage locations $452_1$, $452_2$, ... $452_N$. In some embodiments, items that were sent out for delivery to a delivery address and were returned to the unit delivery facility may be automatically directed to one of the storage locations $452_1$, $452_2$, ... $452_N$.

Each of the small receptacles $462_1$, $462_2$, ... $462_N$ and large receptacles $464_1$, $464_2$, ... $464_N$ can be associated with a receptacle identifier (e.g., an alphanumeric code unique to the receptacle) and/or other receptacle identification information. For example, receptacles can further be associated with receptacle information such as dimensions, a receptacle status such as occupied, empty, operative, inoperative, etc. In some embodiments, the receptacle information can be included in the receptacle identifier. Similarly, storage locations $452_1$, $452_2$, ... $452_N$ can be associated with a storage location identifier (e.g., an alphanumeric code unique to the storage location) and/or other storage location identification information. The identifiers and/or other information associated with the small receptacles $462_1$, $462_2$, ... $462_N$, large receptacles $464_1$, $464_2$, ... $464_N$, and storage locations $452_1$, $452_2$, ... $452_N$ can be stored in the database 475. Each of the small receptacles $462_1$, $462_2$, ... $462_N$, large receptacles $464_1$, $464_2$, ... $464_N$, and/or storage locations $452_1$, $452_2$, ... $452_N$ can have an asset tag affixed thereto, containing the receptacle identifier and/or other information associated with the receptacle or storage location. For example, the asset tag may be a sticker, including a barcode or QR code containing the associated identifier, affixed to an interior surface of a receptacle. In some embodiments, the asset tag is applied to the receptacles $462_1$, $462_2$, ... $462_N$, $464_1$, $464_2$, ... $464_N$, and/or storage locations $452_1$, $452_2$, ... $452_N$ at a location accessible only to the employees. As will be described in greater detail with reference to FIGS. 5-8, the destination device 205 can control and/or initiate various processes for efficient operation of the receptacle management system.

When a delivery is attempted and is unsuccessful (e.g., when the item is to be returned to the unit delivery facility), a delivery notification item can be left at the delivery address. The delivery notification item can be, for example, a handwritten and/or printed paper, slip, receipt, form, such as PS Form 3849, or the like, indicating that an attempt was made to deliver the item. The delivery notification item can include information such as an item identifier, a date of the delivery attempt, a time of the delivery attempt, a delivery address, a location of a unit delivery facility where the item can be retrieved, etc. The delivery notification can further be associated with a delivery notification item identifier (e.g., an alphanumeric code uniquely identifying the delivery notification item). The delivery notification item identifier may be pre-printed on the delivery notification item, for example, in alphanumeric characters and/or in a barcode, QR code, or other computer readable format.

At the time of attempted delivery, a user of the destination device 480 or another mobile device (e.g., an item carrier attempting the delivery) may retrieve or produce a delivery notification item. For example, the user may select a pre-printed delivery notification form and write in the information corresponding to the item, unit delivery facility, etc. The delivery notification form may be pre-printed with a scannable barcode or QR code containing the delivery notification item identifier. At the time of the attempted delivery, the user may scan the barcode or QR code using the mobile device. When the barcode or QR code is scanned, the mobile device can send the delivery notification item identifier contained therein to the server 470 and/or the database 475, where the delivery notification item identifier is stored in association with the item identifier corresponding to the item. Alternatively, the user's mobile device may include a printer configured to print delivery notification items, and the mobile device may transmit the notification item identifier without requiring an additional scanning step. In some embodiments, the server 470 and/or the destination device 480 may cause an electronic notification to be sent to a device or account associated with the recipient. The electronic notification may similarly include a representation of the notification item identifier.

When the item is returned to the unit delivery facility, the item may be scanned at the destination device 480 and assigned to one of storage locations $452_1$, $452_2$, ... $452_N$, as described above. When the item is assigned to a storage location $452_1$, $452_2$, ... $452_N$, the item identifier, storage location identifier, and delivery notification item identifier can all be stored in association with each other in the database 475. Accordingly, when an addressee of the item brings the delivery notification item to the unit delivery facility, the location of the item may be determined based only on the delivery notification item identifier, without requiring the item identifier to be determined first. In some cases, the association between the delivery notification item identifier and the storage location may provide additional redundancy, for example, by allowing for efficient retrieval of an item even if the corresponding item identifier was written incorrectly on the delivery notification item, etc. It will be appreciated that the delivery notification item functionality described above may equally be applied for unsuccessfully delivered items being placed in receptacles $462_1$, $462_2$, ... $462_N$, $464_1$, $464_2$, ... $464_N$.

Figure 5:
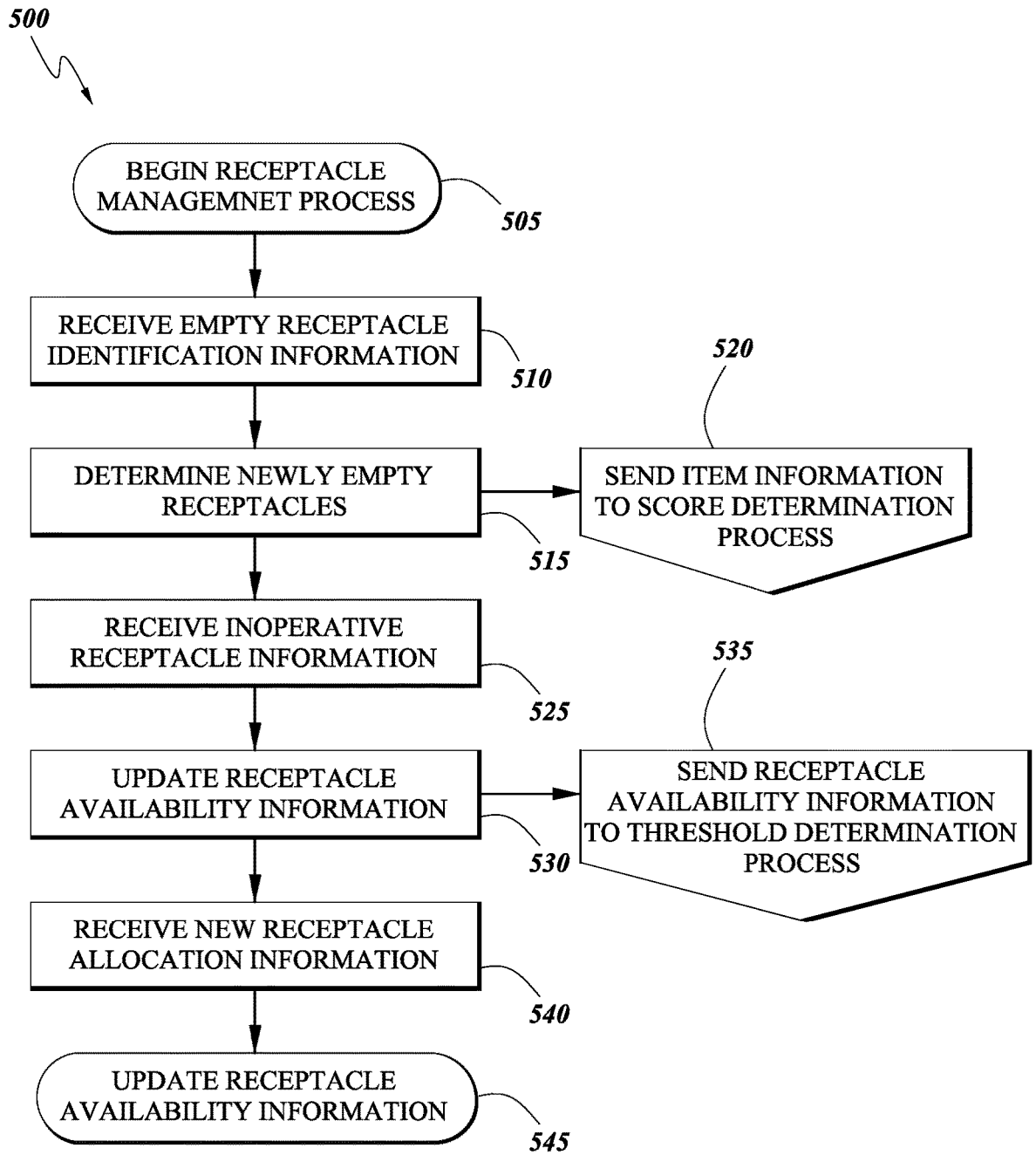
FIG. 5 is a flowchart illustrating an exemplary method of managing item receptacles at an office of a distribution network.

FIG. 5 is a flowchart illustrating an exemplary method 500 of managing item receptacles at a unit delivery facility of a distribution network. The method 500 can be implemented to manage a plurality of receptacles such as the receptacles 100 described above with reference to FIG. 1A. The method 500 can be performed by a computer system integrated within a system such as the receptacle management systems 200, 400 described herein. For example, the method 500 can be performed at least in part by components such as the server 470, the database 475, and/or the destination device 480. It will be appreciated that some or all steps of the method 500 can be performed locally and/or remotely. For example, in some embodiments the entire method 500 can be performed by a destination device 480 based on information and computer executable instructions stored within the memory 392 of the destination device, or the method 500 can be performed by the destination device 480 at least partly based on information and/or computer executable instructions stored within a remote memory such as the database 475.

The method 500 begins at block 505 when the receptacle management method 500 is initiated. The method 500 can be initiated periodically or based on an event. In some embodiments, the method 500 can be performed daily or weekly at a unit delivery facility of a distribution network, for example, at the beginning or end of each day that the office is open. Alternatively or in addition, the method 500 can be performed based on an event such as the arrival of a group of items to be distributed, the retrieval of items from receptacles by recipients, availability of an employee to distribute items to receptacles, or another initiating event. When receptacle management has been initiated, the method 500 continues to block 510.

At block 510, empty receptacle identification information is received. The empty receptacle identification information can be received at a destination device 480 when an employee of the distribution network scans asset tags 105 associated with empty receptacles 120 (e.g., receptacles that do not contain an item that has not yet been retrieved by its recipient). In an example implementation, an employee scans the asset tags 105 associated with all empty receptacles 120 once each day using a destination device 480. For example, all empty receptacles 120 may be scanned each morning before any newly received items are distributed to receptacles. A processor 390 of the destination device 480 determines receptacle identification information (e.g., the receptacle identifier) contained within each scanned asset tag 105. Thus, the receptacle management system can generate a list of all receptacles 120 at the office of the distribution network that are empty.

In some embodiments, the empty receptacle identification information can be received automatically instead of based on manual scanning. For example, the empty receptacle identification information can be determined based on information reported automatically by the item detector 127 and/or the door detector 128 as described with reference to FIG. 1A. In one example, information from the item detector 127 may indicate that an item is not present in the associated receptacle 120. In another example, a door opening event detected at the door detector 128 in a receptacle 120 that previously contained an item may result in a determination that the receptacle 120 is now empty. When the empty receptacle identification information has been received, the method 500 continues to block 515.

At block 515, the system determines which of the empty receptacles are newly empty (e.g., receptacles that were not empty when the method 500 was last performed). Newly empty receptacles can be determined by comparing the empty receptacle identification information to preexisting receptacle availability information stored, for example, in the database 475. For example, the empty receptacle identification information can be compared to a list of receptacles that remained empty after a preceding distribution of items to receptacles. When the newly empty receptacles have been determined, the method 500 continues to blocks 520 and 525.

At block 520, the system determines item identification information associated with the newly empty receptacles. For example, the system can retrieve, from the database 475, an item identifier or other item identification information associated with the last item placed in each newly empty receptacle. The item identification information associated with the newly empty receptacles can then be sent as an input to a score determination process, such as the score determination method 800 described below with reference to FIG. 8.

At block 525, the system receives inoperative receptacle information. The inoperative receptacle information can include a list of receptacle identifiers associated with inoperative receptacles. For example, an employee performing the method 500 can determine that a receptacle is inoperative for various reasons, such as having a malfunctioning lock, a structural failure, a broken or missing door, a broken or missing key, or other defect preventing the ordinary operation of the receptacle. The employee can scan the asset tag associated with each inoperative receptacle to modify an entry in a local or remote memory, such as the database 475, to indicate that the receptacle is inoperative. After inoperative receptacle information is received, the method 500 continues to block 530.

At block 530, receptacle availability information is updated. The receptacle availability information may include a list of identifiers associated with receptacles that are empty, or available for the distribution of items. The receptacle availability information may further include a plurality of database entries including some or all of the receptacles located within the local office of the distribution network and an associated entry indicating whether each receptacle is empty, occupied, or inoperative, and may further include an item identifier associated with an item located in the receptacle. For example, the entries for newly empty receptacle may be updated to change the status of the receptacle from "occupied" to "empty" and may further remove the identification information associated with the package previously in the receptacle. Any receptacles newly determined to be inoperative can be indicated as such in the corresponding database entries. Thus, an updated list of available (e.g., empty and not inoperative) receptacles can be generated. After the updated list of available receptacles is generated, the method 500 continues to blocks 535 and 540.

At block 535, the updated receptacle availability information can be sent to a threshold determination process, such as the threshold determination process 700 described below with reference to FIG. 7. As described in greater detail below, the threshold determination process can determine how many incoming items will be distributed in receptacles, which incoming items will be distributed in receptacles, and a score threshold for placing the items in receptacles. In some embodiments, the threshold determination process can generate receptacle availability information, which can be sent to the receptacle management method 500.

At block 540, the system can receive new receptacle allocation information generated at the threshold determination process. For example, the receptacle allocation information can indicate a number of the available receptacles that are occupied or will be occupied (e.g., receptacles that have had an incoming item assigned for distribution), particular receptacles that will be occupied, etc. After the new receptacle allocation information is received, the method 500 terminates at block 545.

At block 545, receptacle availability information is updated based on the new receptacle allocation information. Updating the receptacle availability information can include, for example, removing individual receptacles from a list of available receptacles, decreasing a recorded number of available receptacles, or the like. When the receptacle availability information has been updated, the method 500 terminates, and can begin again at block 505 the next time the receptacle management process is initiated.

Figure 6:
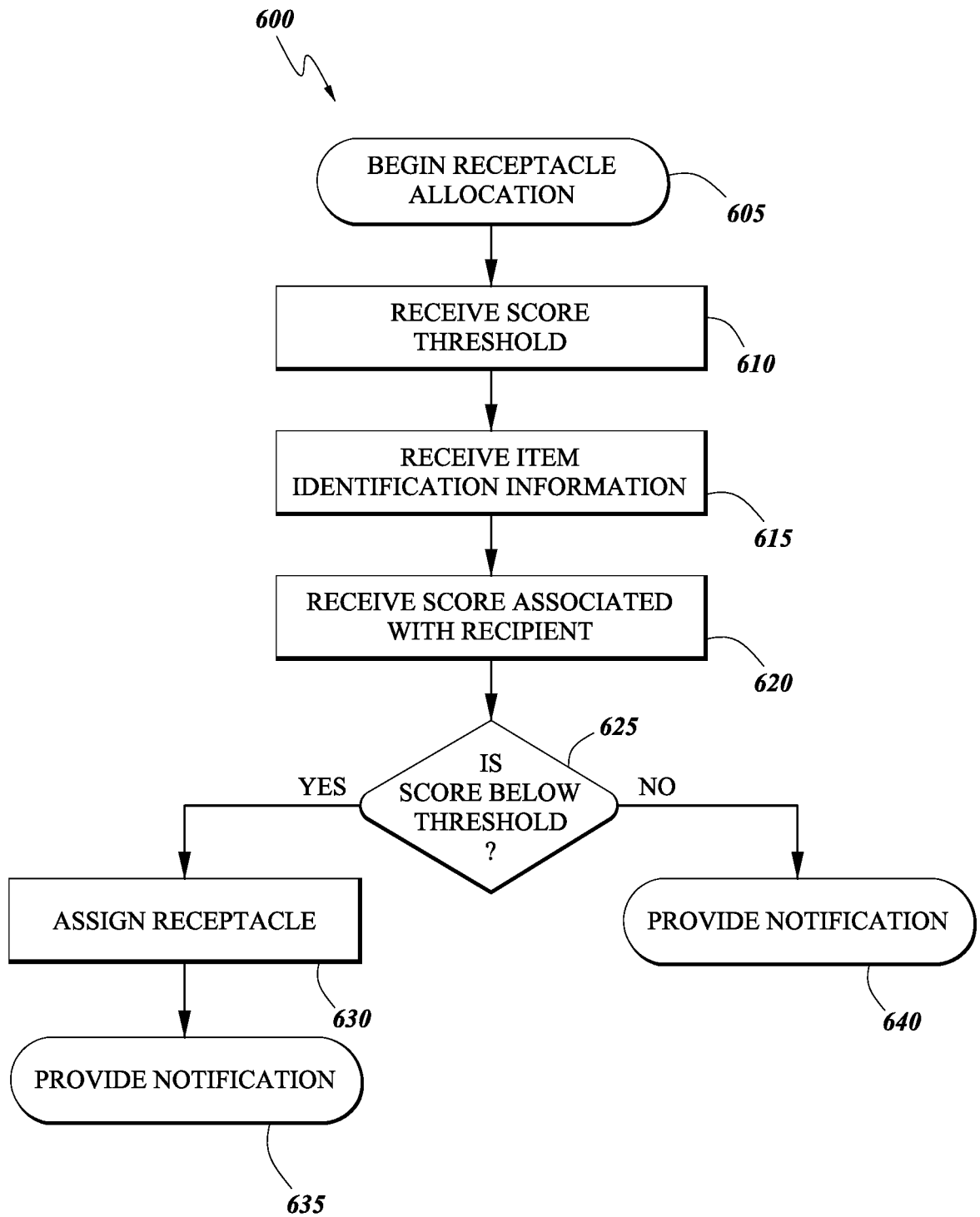
FIG. 6 is a flowchart illustrating an exemplary method of allocating receptacles to items in a receptacle management system.

FIG. 6 is a flowchart illustrating an exemplary method 600 of allocating receptacles to items to be distributed in a receptacle management system. The method 600 can be performed by a computer system integrated within a system such as the receptacle management systems 200, 400 described herein. For example, the method 600 can be performed at least in part by components such as the server 470, the database 475, and/or the destination device 480. It will be appreciated that some or all steps of the method 600 can be performed locally and/or remotely. For example, in some embodiments the entire method 600 can be performed by a destination device 480 based on information and computer executable instructions stored within the memory 392 of the destination device, or the method 600 can be performed by the destination device 480 at least partly based on information and/or computer executable instructions stored within a remote memory such as the database 475.

The method 600 begins at block 605 when receptacle allocation is initiated. Receptacle allocation can be initiated by an employee of a distribution network at an office location containing item receptacles for transferring items to recipients. Receptacle allocation can be initiated at an office of a distribution network when one or more items have been received from elsewhere within the distribution network. For example, a shipment of items may arrive for distribution to recipients. Items corresponding to recipients having delivery boxes at the office location may be selected for distribution to the receptacles located at the office location. Initiation of the receptacle allocation process may further include an employee of the distribution network at the office location selecting a receptacle allocation function using a destination device. When receptacle allocation has been initiated, the method 600 continues to block 610.

At block 610, a score threshold is received. Generally, the score threshold corresponds to a maximum or minimum recipient score for which an item will be assigned to a receptacle. For example, the destination device can retrieve a current score threshold from an internal memory 392 of the destination device, or can retrieve the current score threshold from another component of the receptacle management system such as a server 270, 210, database 475, or other component. If the score threshold is received from a remote component external to the destination device 380, it can be stored within the memory 392 of the destination device for use in the receptacle allocation process. The determination of a score threshold will be described in greater detail with reference to FIG. 7. When the score threshold is received, the method 600 continues to block 615.

At block 615, item identification information is received. The item identification information can include item identifiers or other information corresponding to one or more items to be distributed to recipients. In some embodiments, the item identification can be received when an employee of the distribution network scans an item using a destination device 380. For example, the employee may use the scanning device 382 of the destination device 380 to generate an image of a barcode or QR code on a label affixed to the item. A processor 390 of the destination device can determine an identifier encoded within the barcode or QR code to obtain the item identification information. When the item identification information has been received, the method 600 continues to block 620.

At block 620, a score associated with the intended recipient of the item is received. Using the item identification information, the system can locate a database entry, such as in a database 475 or in a memory 392 of the destination device, corresponding to the item. In some cases, the entry corresponding to the item can be associated with recipient information, such as a code or other information identifying the recipient. Based on the information identifying the recipient, the system can retrieve, from the same data storage location or a different data storage location, a recipient score associated with the recipient. In some embodiments, the score may be a number obtained based on the average number of days the recipient takes to retrieve items from receptacles, or other information associated with past items sent to the recipient. If the score is received from a remote component external to the destination device 380, it can be stored within the memory 392 of the destination device for use in the receptacle allocation process. The determination of recipient scores will be discussed in greater detail with reference to FIG. 8. When the score associated with the recipient is received, the method 600 continues to decision state 625.

At decision state 625, the processor 390 determines whether the score is below the threshold. The processor 390 can compare the score received at block 620 with the score threshold received at block 610. If the processor 390 determines that the score is lower than the threshold for receptacle allocation, the method 600 continues to block 630, where a receptacle is assigned to the item. In some embodiments, a particular receptacle of the local group of receptacles is assigned. Alternatively, the item can generally be approved for placement into a receptacle without a particular receptacle being assigned. After the receptacle is assigned, the method terminates at block 635, where a notification is provided. For example, a message may be displayed on a display 384 of the destination device notifying the employee that the item should be placed into a receptacle. If a particular receptacle has been assigned, information identifying the receptacle may be provided in the notification as well. In some embodiments, the notification may include a receptacle size, for example, in a unit delivery facility including multiple sizes of common item receptacles 120. Based on the notification, the employee can place the item into the receptacle. Upon placing the item into the receptacle, the employee can further scan an asset tag within the receptacle to confirm that the item was placed into the correct receptacle. Alternatively, in embodiments in which a particular receptacle was not assigned at block 630, the asset tag scan can indicate to the receptacle management system which receptacle the item was placed into. In some embodiments, the destination device 480 and/or the server 470 can cause an electronic notification to be sent to a device or account associated with the recipient, in response to determining that the item was placed into a receptacle. The electronic notification can include, for example, an email, a mobile device alert, a text message, an automated phone call, or the like. The electronic notification can include one or more information items such as an item identifier, receptacle information indicating an identifier and/or location of the assigned receptacle, and/or narrative information informing the recipient that an item is ready to be retrieved. In some embodiments, the electronic notification can further include machine-readable information (e.g., a barcode or QR code), which may be scanned at an electronic lock of the receptacle in order to open the electronic lock. In some embodiments, the thresholding processes described herein can be inverted, i.e., scores can be determined such that receptacles are assigned to items for recipients having scores above a threshold, and receptacles are not assigned to items for recipients having scores below the threshold.

Referring again to decision state 625, if the processor 390 determines that the score is not lower than the threshold for receptacle allocation, the method 600 terminates at block 640, where a notification is provided. For example, a message may be displayed on the display 384 notifying the employee that the item should not be placed into a receptacle. Based on the notification, the employee can place the item into a storage area with other items that have not been allocated to a receptacle. In some embodiments, the notification at block 640 can further include an indication that the item should be placed in a particular storage location within the storage area, as described above with reference to FIG. 2. In such embodiments, the employee can place the item into the assigned storage location within the storage area.

After the method 600 terminates at block 635 or block 640, the method 600 can be repeated as many times as desired. For example, the method 600 can be performed for each item of a group of items received at the unit delivery facility. In some embodiments, the steps of the method 600 can be performed based on a predetermined set of computer executable instructions such that an employee can select a "receptacle allocation" option on the destination device 380, scan a label on an item at the scanning device 382, and be provided with a notification on the display 384 shortly thereafter. Thus, the employee can implement the receptacle allocation method easily without having to identify the recipient, a recipient score, or a score threshold. Alternatively, in some embodiments, the employee can have greater control over the method 600. For example, the destination device 480 can be configured to retrieve the recipient score and display the score to the employee, who can then decide based on the score whether to place the item in a receptacle or in the storage area.

Figure 7:
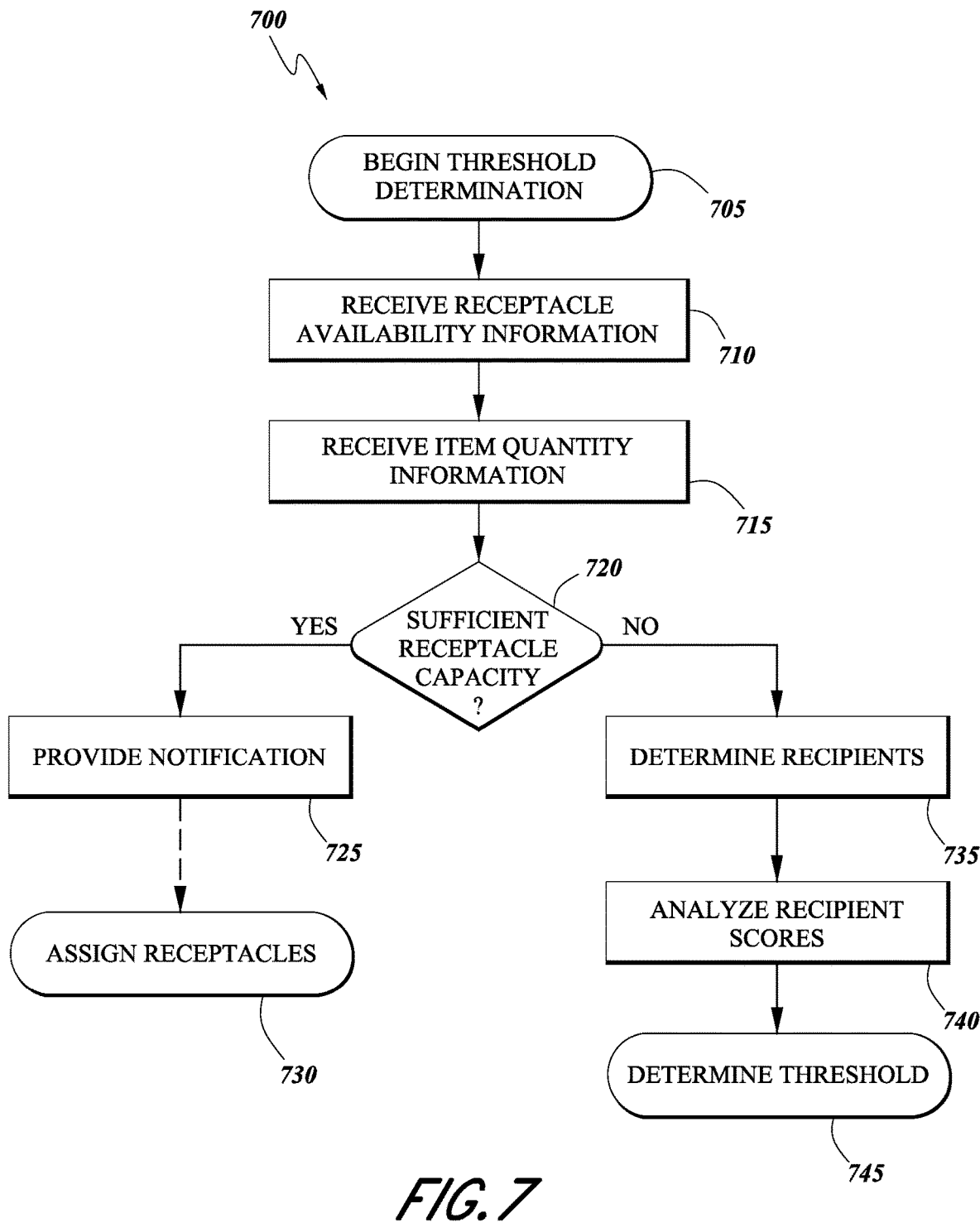
FIG. 7 is a flowchart illustrating an exemplary method of determining a recipient score threshold for allocating receptacles in a receptacle management system.

FIG. 7 is a flowchart illustrating an exemplary method 700 for determining a recipient score threshold for allocating receptacles in a receptacle management system. The method 700 can be performed by a computer system integrated within a system such as the receptacle management systems 200, 400 described herein. For example, the method 700 can be performed at least in part by components such as the server 470, the database 475, and/or the destination device 480. It will be appreciated that some or all steps of the method 700 can be performed locally and/or remotely. For example, in some embodiments the entire method 700 can be performed by a destination device 480 based on information and computer executable instructions stored within the memory 392 of the destination device, or the method 700 can be performed by the destination device 480 at least partly based on information and/or computer executable instructions stored within a remote memory such as the database 475.

The method 700 begins at block 705, where the score threshold determination method 700 is initiated. The method 700 can be initiated periodically or based on an event. In some embodiments, the method 700 can be performed daily or weekly at a unit delivery facility of a distribution network, for example, at the beginning or end of each day that the office is open. Alternatively or in addition, the method 700 can be performed based on an event such as the arrival of a group of items to be distributed, or when the receptacle allocation method 600 is initiated. In some embodiments, the threshold determination method 700 can update a score threshold stored at a memory 392 of a destination device, and/or at a server 270, 470 or database 475 of the receptacle management system. The stored score threshold may be maintained and used for receptacle allocation between updates. When threshold determination is initiated, the method 700 continues to block 710.

At block 710, receptacle availability information is received. As described above with reference to FIG. 5, the receptacle availability information can be received from a computer system component executing the method 500 at block 535. The receptacle availability information can include a list of receptacles that are available, for example, a list of all receptacles located within the unit delivery facility that are empty and are not inoperative. In embodiments in which particular receptacles are not assigned, the receptacle availability information can include a number n of available receptacles rather than a list of individual receptacles that are available. When the receptacle availability information is received, the method continues to block 715.

At block 715, item quantity information is received. Item quantity information can be received from a component of the receptacle management system such as a server 270, 470 and/or a database 475, based on a number of items received at the unit delivery facility and/or a number of items in transit to the unit delivery facility, such as a number of items expected to arrive within 2 hours, 4 hours, 6 hours, 12 hours, 1 day, 2 days, or other desired time period. Thus, the item quantity information can include a number of items present at the unit delivery facility at the time of the threshold determination, or an expected total number of items that will be present at a future time after the threshold determination is completed. When the item quantity information has been received, the method continues to decision state 720.

At decision state 720, it is determined whether the unit delivery facility has sufficient receptacle capacity. The determination at block 720 can be performed by comparing the number of available receptacles received at block 710 to a number of items in the item quantity information received at block 715. If the number of available receptacles is greater than the number of items in the item quantity information, it can be determined that the unit delivery facility has sufficient receptacle capacity for the present and/or imminently arriving items. If the number of available receptacles is less than the number of items in the item quantity information, it can be determined that the unit delivery facility does not have sufficient receptacle capacity for the present and/or imminently arriving items.

If it is determined at decision state 720 that the unit delivery facility has sufficient receptacle capacity, all items can be allocated to receptacles and a threshold need not be determined. In this case, the method 700 continues to block 725, where a notification is provided. In some embodiments, the notification includes a message to one or more employees, such as a message displayed at a display 384 of a destination device 380, indication that all items can be placed into receptacles. Alternatively, the notification of block 725 can simply include providing a positive notification as described at block 635 of the method 600 for each item scanned for receptacle allocation. The method 700 can terminate at block 725, or can terminate at block 730 by assigning particular receptacles to items identified in the item quantity information.

If it is determined at decision state 720 that the unit delivery facility does not have sufficient receptacle capacity, the method 700 continues to block 735, where the recipients of the items are determined. The recipients of the items can be determined based on information, such as postage information, stored in a database 475 of the receptacle management system or elsewhere in a computer system of the distribution network. For example, a recipient identifier associated with each item can be retrieved and stored. In some embodiments, a list of the retrieved recipient identifiers can be generated. When the recipients have been determined, the method 700 continues to block 740.

At block 740, recipient scores are analyzed. Recipient scores associated with the recipient identifiers can be retrieved, such as from the same data storage location where the recipient identifiers were retrieved, or from a different data storage location within the receptacle management system, in which known recipient identifiers are stored in association with current recipient scores. Analysis of recipient scores can include various statistical analyses. For example, the recipient scores may be compared with a number of possible thresholds and the number x of recipients in the list with scores below each threshold may be determined. In another example, the lowest n scores may be identified, where n is the number of available receptacles based on the receptacle availability information received at block 710, and candidate threshold values slightly above and/or slightly below the highest of the n scores can be generated. After the recipient scores are analyzed, the method 700 terminates at block 745.

At block 745, a score threshold is determined based on the analysis of recipient scores performed at block 740. The score threshold determination at block 745 may include one or more final analytical steps following the analysis of block 740. For example, if the recipient scores have been compared with a number of possible thresholds, the system may select the threshold for which the number x is the largest without exceeding the number n of available receptacles received at block 710. In another example, if the lowest n scores were identified in block 740, the system may further determine which of the candidate threshold values will result in n or fewer items being assigned to receptacles. When a final threshold value has been determined at block 745, the method 700 terminates and the score threshold can be sent as an input to the receptacle allocation method 600 at block 610, as shown in FIG. 6.

As described above, determining a threshold based on a combined number of items present at the unit delivery facility and items that have not arrived yet may enhance the efficiency of receptacle management systems. In an illustrative example, a unit delivery facility has 50 item receptacles, of which 5 are inoperative and 15 are occupied, such that 30 receptacles are available. On an example day, the unit delivery facility receives 28 items with scores ranging from 1.2 to 6. Although all 28 items could be placed into receptacles that day, the threshold determination methods described above may result into some of the 28 items being placed in a storage area rather than a receptacle. For example, the item quantity information may indicate that 50 items are due to arrive the following day, and that the recipients associated with 10 of the 50 items have scores lower than the 8 highest scores of the 28 present items. In this situation, 20 of the present items may be placed into receptacles, while the other 10 available receptacles may remain empty such that more items associated with lower recipient scores can be placed into receptacles the following day. It will be appreciated that the foregoing example is a relatively simplified implementation. Additional factors, such as expected future receptacle availability or other considerations, may be included in the score threshold determination analysis.

Figure 8:
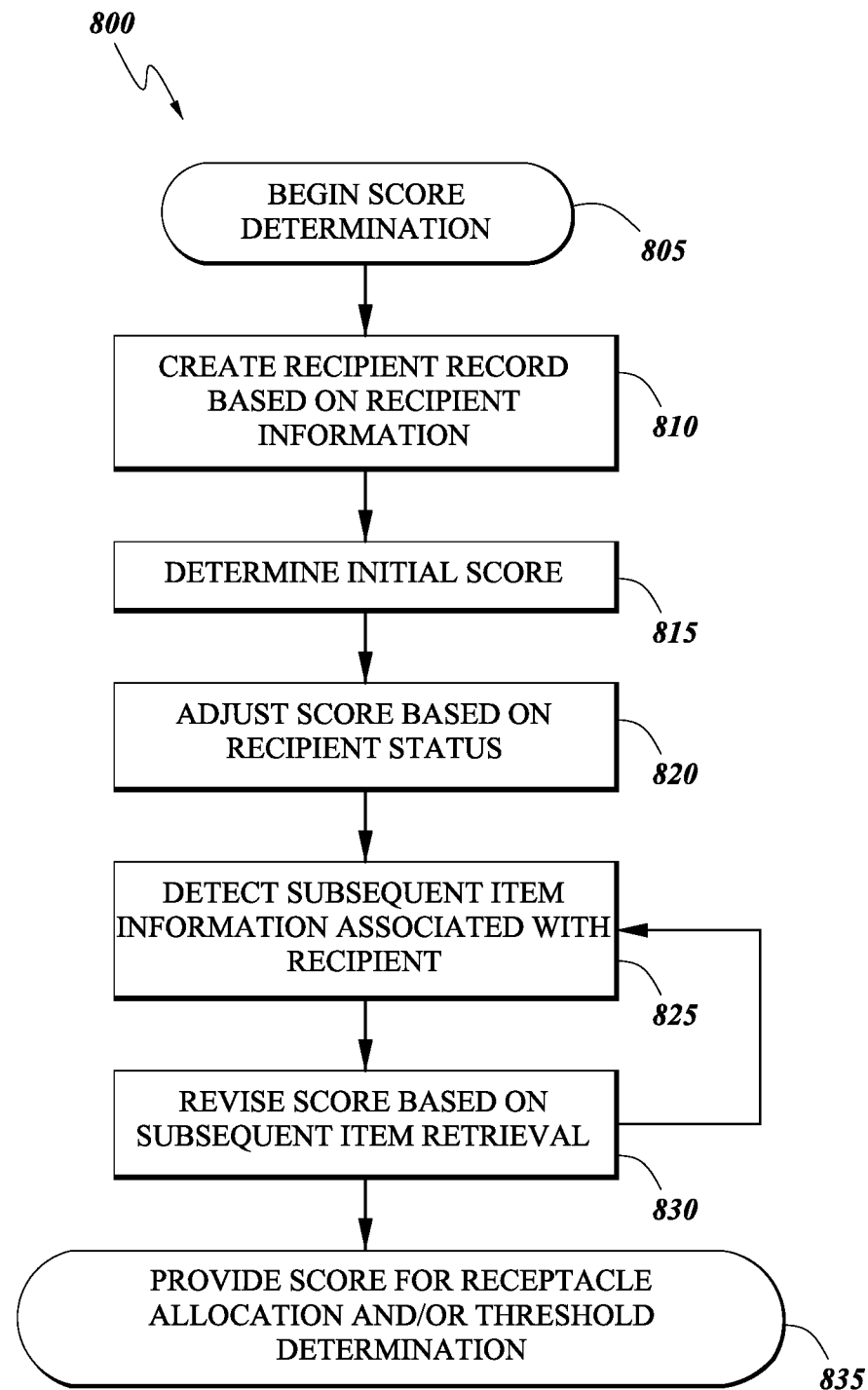
FIG. 8 is a flowchart illustrating an exemplary method of determining a recipient score in a receptacle management system.

FIG. 8 is a flowchart illustrating an exemplary method 800 for determining a recipient score in a receptacle management system. The method 800 can be performed by a computer system integrated within a system such as the receptacle management systems 200, 400 described herein. For example, the method 800 can be performed at least in part by components such as the server 470, the database 475, and/or the destination device 480. It will be appreciated that some or all steps of the method 800 can be performed locally and/or remotely. For example, in some embodiments the entire method 800 can be performed by a server 270, 210 located within a unit delivery facility to determine and/or update scores for recipients associated with the unit delivery facility, or the method 800 can be performed by a server 270, 210 located centrally to determine and/or update scores for recipients associated with multiple unit delivery facilities and/or for the entire distribution network.

The method 800 begins at block 805, when score determination is initiated. The method 800 can be performed based on an event such as a new recipient being identified based on shipping information, a potential recipient requesting the creation of an account for item receptacle allocation, a new customer of the distribution network being assigned to a delivery box at a unit delivery facility, or the like. In some embodiments, the score determination method 800 can be performed periodically, such as every day, once a week, etc. When recipient score determination has been initiated, the method 800 continues to block 810.

At block 810, a recipient record is created based on recipient information. For example, the record may be an entry in a database 475 within the receptacle management system or elsewhere within the distribution network. The recipient record can be associated with a recipient identifier, such as an alphanumeric code uniquely identifying the recipient, and can further be associated with other information associated with the recipient, such as a name, address, business name, delivery address, assigned delivery box identifier, and/or preference information (e.g., additional services requested and/or purchased, such as item receptacle priority or other services). When the recipient record has been created, the method 800 continues to block 815.

At block 815, an initial score is determined for the recipient. In some embodiments, the system may set the initial score to a default score. For example, the default score may be relatively low such that the first items delivered to each recipient will likely be placed in receptacles, thereby allowing recipients several opportunities to produce a reliable score for future items. In another example, the default score may be somewhat higher such that receptacle allocation is prioritized to recipients with established scores, and newer recipients will only occasionally have their items placed in receptacles until they have received enough deliveries to establish a lower and/or more accurate score. Alternatively, the initial score may be determined based on a first item retrieval associated with the recipient. For example, the recipient record may have been created when an item was sent through the distribution network to the recipient. If the item is delivered to the recipient via a receptacle at the unit delivery facility, the system tracks the number of days before the recipient retrieves the item and determines an initial score for the recipient based on the number. When an initial score has been determined, the method 800 continues to block 820.

At block 820, the score can be adjusted based on a status of the recipient. For example, in some cases a recipient may request prioritized allocation of receptacles, such as by purchasing, subscribing to, or otherwise qualifying for the service. Based on the prioritized status, the recipient's score may be adjusted downward from the initial score. For example, the score may be adjusted by subtracting a predetermined number from the recipient score, dividing the recipient score by a predetermined factor, and/or fixing the subscriber's recipient score to a low value, such as 1, that will consistently cause the subscriber's items to be placed into a receptacle rather than kept in a storage area. In some aspects, the score may be set to a minimum value, such as if the recipient's status allows for all items for the recipient to be placed into a receptacle, regardless of the recipient's retrieval time. When any necessary status adjustments to the score have been made, the method 800 continues to block 825.

At block 825, subsequent item information associated with the recipient is detected. Generally, block 825 can occur any time an item is received at the distribution network or distributed to a unit delivery facility. For example, when items are received at a unit delivery facility, the items may be scanned in a destination scan event. For some or all of the items scanned, a recipient can be identified, and block 825 of the score determination method 800 can be triggered for each identified recipient. When item information associated with a known recipient is detected at block 825, a database entry corresponding to the recipient can be updated to include the new item information associated with the recipient, and the method 800 continues to block 830.

At block 830, the recipient's score is revised based on subsequent retrieval of the item. When the item is retrieved, the receptacle management system determines how long the item was in a receptacle before the recipient retrieved the item. In a relatively simple example in which a recipient's score is an average number of days taken to retrieve items, the average number for the recipient can be adjusted based on the time the item was in the receptacle. After the recipient's score is revised based on the subsequent item retrieval, the method 800 can return to block 825 any time a new item is detected associated with the recipient. When an item associated with the recipient is not placed into a receptacle, the method 800 can return to block 825 without revising the score. The method 800 can continue being updated indefinitely, with each additional item retrieval from a receptacle causing an adjustment of the recipient score as an additional data point. In some embodiments, retrieval times associated with more recent items can be given greater weight in the score determination than retrieval times associated with older items, for example, such that the score is more indicative of the recipient's current item retrieval behavior than the recipient's item retrieval behavior during an earlier time period.

The method can terminate at block 835 when the current recipient score is provided for receptacle allocation and/or threshold determination processes. For example, the score can be provided to the receptacle allocation method 600 of FIG. 6 at block 620 when an item is being scanned to determine whether the item will be placed in a receptacle or a storage area. The score can additionally be provided to the threshold determination method 700 of FIG. 7 at block 740 when a score threshold is being determined for the distribution of items arriving at a unit delivery facility. Although the methods described herein involve allocating items to receptacles when scores are below a score threshold, it will be appreciated that these methods can equally include allocating items to receptacles when scores are above a score threshold (e.g., in score determination systems in which frequent item retrieval results in a high score, rather than a low score).

With continued reference to FIG. 8, example recipient score systems will now be described. Each recipient score is based at least in part on the recipient's item retrieval history and/or habits. In one example, the recipient score can be an average number of days that pass between the recipient's item being placed into a receptacle and the recipient retrieving the item. Thus, if a first recipient tends to visit the unit delivery facility daily or almost daily to retrieve any waiting items, the recipient may have a relatively low score, for example, 1.2, 1.5, or another score relatively close to 1. A second recipient may tend to visit the unit delivery facility only once per week, and may have a higher score, such as 6, 6.5, 7, or higher. For example, the average may be updated at block 830 each time the recipient retrieves an item from a receptacle 120. Alternatively, it will be appreciated that recipient scores can be determined based on any number of other mathematical algorithms performed at block 830 to generate a number based on a recipient's item retrieval habits and/or history. For example, some score determination algorithms may result in low scores when items are often retrieved promptly, while other score determination algorithms may result in high scores when items are often retrieved promptly.

In some embodiments, the scores may include additional information based on further analysis of recipients' item retrieval habits. In one example, the system may track the days of the week on which a recipient most frequently visits the unit delivery facility to retrieve items. In an illustrative case, most or all of the items delivered to one recipient have been retrieved on Tuesdays. Accordingly, the recipient's score may be adjusted over time at block 830 to change throughout the week, e.g., the recipient's score may be 6 on Wednesdays, 5 on Thursdays, 4 on Fridays, etc. In this case, an item for the recipient scanned at the unit delivery facility on a Monday may result in a score of 1 being retrieved, and may be allocated to a receptacle 120 because it will likely be retrieved the next day, while an item for the recipient scanned at the unit delivery facility on a Wednesday may result in a score of 6 being retrieved, and may be placed in a storage area because it will likely not be retrieved until the following Tuesday.

The foregoing description details certain embodiments of the systems, devices, and methods disclosed herein. It will be appreciated, however, that no matter how detailed the foregoing appears in text, the systems, devices, and methods can be practiced in many ways. It should be noted that the use of particular terminology when describing certain features or aspects of the invention should not be taken to imply that the terminology is being re-defined herein to be restricted to including any specific characteristics of the features or aspects of the technology with which that terminology is associated.

It will be appreciated by those skilled in the art that various modifications and changes may be made without departing from the scope of the described technology. Such modifications and changes are intended to fall within the scope of the embodiments. It will also be appreciated by those of skill in the art that parts included in one embodiment are interchangeable with other embodiments; one or more parts from a depicted embodiment can be included with other depicted embodiments in any combination. For example, any of the various components described herein and/or depicted in the Figures may be combined, interchanged or excluded from other embodiments.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should typically be interpreted to mean "at least one" or "one or more"); the same holds true for the use of definite articles used to introduce claim recitations. In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

All references cited herein are incorporated herein by reference in their entirety. To the extent publications and patents or patent applications incorporated by reference contradict the disclosure contained in the specification, the specification is intended to supersede and/or take precedence over any such contradictory material.

The term "comprising" as used herein is synonymous with "including," "containing," or "characterized by," and is inclusive or open-ended and does not exclude additional, unrecited elements or method steps.

It is noted that some examples above may be described as a process, which is depicted as a flowchart, a flow diagram, a structure diagram, or a block diagram. Although a flowchart may describe the operations as a sequential process, many of the operations can be performed in parallel, or concurrently, and the process can be repeated. In addition, the order of the operations may be rearranged. A process is terminated when its operations are completed. A process may correspond to a method, a function, a procedure, a subroutine, a subprogram, etc. When a process corresponds to a software function, its termination corresponds to a return of the function to the calling function or the main function.

The above description discloses several methods and materials of the present invention. This invention is susceptible to modifications in the methods and materials, as well as alterations in the fabrication methods and equipment. Such modifications will become apparent to those skilled in the art from a consideration of this disclosure or practice of the invention disclosed herein. Consequently, it is not intended that this invention be limited to the specific embodiments disclosed herein, but that it cover all modifications and alternatives coming within the true scope and spirit of the invention as embodied in the attached claims.

What is claimed is:

1. A system for delivery of items comprising:
   a plurality of receptacles for receiving items, the plurality of receptacles located at a unit delivery facility of a distribution network;
   a database storing a plurality of recipient scores, each recipient score associated with a recipient of a plurality of recipients;
   a scanning device configured to scan asset tags on the plurality of receptacles and generate scan data based on scanning the asset tags; and
   one or more processors in communication with the database and the scanning device, the one or more processors configured to:
      obtain, from the scanning device, the scan data corresponding to unoccupied receptacles of the plurality of receptacles;
      determine, based on the obtained scan data, receptacle availability information indicating available receptacle capacity of the plurality of receptacles;
      revise one or more of the plurality of recipient scores based on the scan data;
      update the database by storing the revised one or more of the plurality of recipient scores;
      receive item quantity information including a number of items to be distributed at the unit delivery facility within a specified time period and intended recipients of the items;
      determine that the number of items or intended recipients exceeds the available receptacle capacity based at least in part on the scan data;
      determine a recipient score threshold in response to determining that the number of items or intended recipients exceeds the available receptacle capacity;
      obtain, from the scanning device, an image of an item to be delivered;
      determine an intended recipient of the item based on the obtained image;
      retrieve, from the updated database, a revised recipient score corresponding to the determined intended recipient;
      compare the recipient score threshold to the recipient score of the determined intended recipient;
      assign one of the receptacles to the determined intended recipient based on a determination that the recipient score satisfies the recipient score threshold;
      cause the item to be placed into the assigned one of the receptacles;
      detect retrieval of the item from the assigned one of the receptacles;
      further revise the recipient score corresponding to the determined intended recipient, based on the detected retrieval of the item, for distribution of subsequent items addressed to the determined intended recipient; and in response to receiving the subsequent items in item processing equipment of the distribution network, control the item processing equipment to sort the subsequent items for distribution to the determined intended recipient in accordance with the further revised recipient score.

2. The system of claim 1, wherein each recipient score is determined based on one or more of an initial recipient score value, historical data corresponding to timing of retrieval of items by the recipient, and a status of the recipient.

3. The system of claim 2, wherein the status of the recipient corresponds to a prioritized status requested by the recipient.

4. The system of claim 2, wherein the historical data corresponding to timing of retrieval corresponds to delay in retrieval of items by the recipient.

5. The system of claim 1, wherein the one or more processors are further configured to:
obtain, using the scanning device, an image of an asset tag corresponding to the receptacle to which the item is assigned;
transmit a message indicative of the item being placed into the receptacle to which the item is allocated; and
store an association between the item and the receptacle.

6. The system of claim 5, wherein the one or more processors are further configured to send an electronic notification to a device or account associated with the intended recipient, the electronic notification comprising at least one of a receptacle identifier and machine readable information operable to unlock an electronic lock.

7. The system of claim 1, wherein the one or more processors are further configured to cause a destination device to display a receptacle identifier corresponding to the receptacle to which the item is assigned.

8. The system of claim 1, wherein the plurality of receptacles comprise lockable item receptacles located in a publicly accessible area of a unit delivery facility.

9. The system of claim 1, wherein the one or more processors are further configured in conjunction with the scanning device to periodically scan asset tags corresponding to unoccupied receptacles of the plurality of receptacles and to cause, at least in part, an update to one or more of the receptacle availability information, the recipient scores and the score threshold based at least in part on the scanned asset tags.

10. The system of claim 1, wherein the one or more processors are further configured to:
obtain, using the scanning device, an image of a second item to be delivered;
determine, based on the image, a second intended recipient of the second item;
retrieve, from the database, a second recipient score corresponding to the second recipient;
determine, based at least in part on the second recipient score and the predetermined recipient score threshold, that the second item will not be assigned to any of the receptacles; and
cause a destination device to display an indication that the second item is not assigned to a receptacle.

11. The system of claim 10, wherein the one or more processors are further configured to cause the destination device to display an identifier of a storage location, other than the plurality of receptacles, in which the item should be placed.

12. A method for distributing items to recipients, the method comprising:
scanning asset tags corresponding to unoccupied receptacles of a plurality of receptacles at a unit delivery facility of a distribution network;
determining, based on the scanned asset tags, receptacle availability information indicating available receptacle capacity of the plurality of receptacles;
revising one or more recipient scores of a plurality of recipient scores stored in a database, based on the scanned asset tags;
updating the database by storing the revised one or more recipient scores;
receiving item quantity information including a number of items to be distributed at the unit delivery facility within a specified time period and intended recipients of the items;
retrieving, from the updated database, a subset of the plurality of recipient scores corresponding to the intended recipients associated with the items to be distributed;
determining that the number of items or intended recipients exceeds the available receptacle capacity based at least in part on the scanned asset tags;
determining a recipient score threshold in response to determining that the number of items or intended recipients exceeds the available receptacle capacity, based on the receptacle availability information, the item quantity information, and the recipient scores;
scanning individual items to obtain images of the individual items;
determining intended recipients of the individual items based on the images;
determining the recipient scores corresponding to the intended recipients of the items;
identifying items with intended recipients having recipient scores that satisfy the recipient score threshold based on a comparison of individual recipient scores to the recipient score threshold;
placing the identified items into receptacles of the plurality of receptacles;
detecting retrieval of the item from the assigned one of the receptacles;
further revising the recipient score corresponding to the determined intended recipient for distribution of subsequent items addressed to the determined intended recipient;
receiving, in item processing equipment of the distribution network, the subsequent items addressed to the determined intended recipient; and
controlling, by a hardware processor in response to receiving the subsequent items, the item processing equipment to sort the subsequent items for distribution to the determined intended recipient in accordance with the further revised recipient score.

13. The method of claim 12, further comprising:
identifying items with intended recipients having recipient scores that do not satisfy the recipient score threshold;
determining that the items with intended recipients having recipient scores that do not satisfy the recipient score threshold will not be placed into receptacles of the plurality of receptacles.

14. The method of claim 12, further comprising:
receiving subsequent receptacle availability information indicating that an item has been retrieved from a receptacle; and
causing an update to the recipient score corresponding to the intended recipient of the item based on an elapsed time between placing the item into the receptacle and receiving the subsequent receptacle availability information.

15. The method of claim 14, wherein the update to the recipient score increases a probability that subsequent items associated with the intended recipient will be placed into a receptacle if the elapsed time is relatively short, and wherein the update to the recipient score decreases the probability that subsequent items associated with the intended recipient will be placed into a receptacle if the elapsed time is relatively long.

16. The method of claim 12, further comprising causing, at least in part, an electronic notification to be sent to a device or account corresponding to the intended recipient, the electronic notification comprising at least one of a receptacle identifier and machine readable information operable to unlock an electronic lock.

17. A system for managing a plurality of receptacles for distributing items to recipients, the system comprising:
- means for scanning asset tags corresponding to unoccupied receptacles of a plurality of receptacles at a unit delivery facility of a distribution network;
- means for updating receptacle availability information indicative of unoccupied receptacle capacity in the unit delivery facility based on the scanned asset tags;
- means for maintaining item information indicative of a number of items to be received for distribution via the unit delivery facility within a specified time period and intended recipients of the items;
- means for revising recipient score information corresponding to a plurality of intended recipients associated with the unit delivery facility based on the scanned asset tags;
- means for determining that the number of items or intended recipients exceeds the unoccupied receptacle capacity;
- means for determining a recipient score threshold for allocation of the items to unoccupied receptacles in response to determining that the number of items or intended recipients exceeds the unoccupied receptacle capacity, based on the receptacle availability information, the item information, and the recipient score information;
- means for assigning individual items to unoccupied receptacles based on a comparison of individual recipient scores in the recipient score information to the recipient score threshold;
- means for detecting retrieval of the individual items from the assigned receptacles;
- means for further revising the recipient score information, based on the detected retrieval of the individual items, for distribution of subsequent items; and
- means for automatically controlling item processing equipment of the distribution network, in response to receiving the subsequent items in the item processing equipment, to sort the subsequent items for distribution to the determined intended recipient in accordance with the further revised recipient score.

18. The system of claim 17, wherein the means for maintaining receptacle availability information, the means for maintaining item information, and the means for determining a recipient score threshold are each configured to update on a periodic schedule.

19. The system of claim 17, wherein the means for maintaining recipient score information is configured to update on an event-based schedule.

20. The system of claim 17, further comprising means for sending electronic notifications to recipients associated with the items assigned to unoccupied receptacles.

* * * * *